United States Patent
Sandford et al.

(10) Patent No.: US 6,823,718 B2
(45) Date of Patent: Nov. 30, 2004

(54) SINGLE-BODY MULTIPLE SENSING DEVICE

(75) Inventors: Michael Sandford, Oxnard, CA (US); Fermin A. Sandoval Diaz, Camarillo, CA (US)

(73) Assignee: PTI Technologies, Inc., Oxnard, CA (US)

( * ) Notice: Subject to any disclaimer, the term of this patent is extended or adjusted under 35 U.S.C. 154(b) by 0 days.

(21) Appl. No.: 10/281,692

(22) Filed: Oct. 28, 2002

(65) Prior Publication Data

US 2004/0079148 A1 Apr. 29, 2004

(51) Int. Cl.⁷ .............................................. G01M 19/00
(52) U.S. Cl. ............................. 73/37; 73/714; 73/756; 73/866.5; 73/168; 210/87; 210/90
(58) Field of Search ........................ 73/37, 866.5, 168, 73/714, 756; 210/87, 90, 149

(56) References Cited

U.S. PATENT DOCUMENTS

| | | |
|---|---|---|
| 2,942,572 A | 6/1960 | Pall |
| 3,262,565 A | 7/1966 | Silverwater |
| 5,096,574 A | 3/1992 | Birdsong et al. |
| 5,163,920 A | 11/1992 | Olive |
| 5,702,592 A | 12/1997 | Suri et al. |
| 5,788,468 A | 8/1998 | Dewa et al. |
| 5,883,310 A | 3/1999 | Ho et al. |
| 5,968,371 A | 10/1999 | Verdegan et al. |
| 6,030,525 A | 2/2000 | Eimer et al. |
| 6,051,144 A | 4/2000 | Clack et al. |
| 6,071,819 A | 6/2000 | Tai et al. |
| 6,076,392 A | 6/2000 | Drzewiecki |
| 6,077,422 A | 6/2000 | Ryles |
| 6,077,435 A | 6/2000 | Beck et al. |
| 6,286,363 B1 | 9/2001 | Discenzo |
| 6,471,853 B1 | 10/2002 | Moscaritolo ................ 210/85 |

OTHER PUBLICATIONS

Aerospace Engineering, Jan./Feb. 1994, "Hydraulic System Diagnostic Sensors", pp. 43–48.
http://www/transtronics.com/xprimer.htm; Pressure Transducer Basics: A Primer, Nov. 20, 2000, pp. 1–13.

Primary Examiner—Daniel S. Larkin
(74) Attorney, Agent, or Firm—Pillsbury Winthrop LLP

(57) ABSTRACT

A sensor component that may be used in conjunction with a filter module may include a plurality of sensor packages. The latter, in turn, may incorporate one or more microelectromechanical systems (MEMS) sensors to measure various characteristics of fluid flow and filtration. A single sensor component may be adapted to measure the pressure, temperature, flow rate, differential pressure, conductivity, viscosity, pH level, etc. of the fluid at an upstream and a downstream location. Sensor measurements may be obtained continuously in order to monitor and indicate fluid conditions, including the use of a warning mechanism to indicate an out-of-range condition when the measurements fall outside of pre-set limits. Depending on the application and the fluid being filtered, data, including measurement data, may be transmitted through electrical connections or wirelessly. In wireless configurations, a sleep-mode may be included to maximize the life of local power supplies.

26 Claims, 10 Drawing Sheets bottom view section A-A bottom view section A-A section B-B

SINGLE-BODY MULTIPLE SENSING DEVICE

FIELD OF INVENTION

The present invention is directed to filtration systems incorporating micro-electromechanical systems (MEMS) to provide flow and filtration characteristic data.

BACKGROUND

Filter modules have been used in a variety of applications and fluidic environments. When in service, it is often desirable to sense and measure various fluid flow and filter performance characteristics in order to determine whether a filter element within the filter module is performing within application specifications, and whether a filter element must be replaced or reconditioned before continuing operation.

In typical filter modules, a filter element is encased within a filter body, or casing (e.g., a filter bowl), and between inlet and outlet end caps. A filter manifold(s) may be attached to the filter body to feed unfiltered medium to the upstream side of the filter element (e.g., where the filter element is cylindrical, the outside of the filter element). As the medium passes to the downstream side of the filter element through the membrane material, contaminants are removed from the medium. Filtered medium is then collected from the downstream side of the filter element (e.g., where the filter element is cylindrical, the inside of the filter element).

During the filter element's service life, an increasing amount of removed contaminant will collect on one side of the filter element in a phenomenon known as fouling. Fouling causes the pressure difference between the upstream and downstream sides of the filter element to increase, and thereby lowers the filtration efficiency of the filter element. If the differential pressure exceeds a certain value that is dependent upon the filter element material and design, the filter element may be damaged. Additionally, at high differential pressures, particle breakthrough (i.e., contaminant particles passing through the pores in the filter element) may occur.

In prior modules, the filter head may have contained conventional pressure transducers, magnetic type differential pressure sensors, virtual pressure switches, and temperature detectors to measure characteristics of fluid flow and filter performance. These components are used to sense the differential pressure across the filter element to determine whether the filter element is sufficiently clogged with contaminant removed from the fluid flow to require replacement. These pressure sensors are generally binary in nature, i.e., they either indicate that the filter element needs to be replaced (e.g., by causing a part to pop up out of the exterior of the filter head) or that it is still useable.

Typically, traditional differential pressure indicators (e.g., spring and piston designs) contain a multiplicity of discrete, macro-scale, mechanical parts and/or components, which makes them more prone to failure. As an example, a thermal lockout mechanism is typically used to prevent false indications during cold-start conditions. In existing designs, the thermal lockout mechanism uses the thermal expansion qualities of BI-metal strips to keep the differential pressure indicator from actuating until a pre-set temperature is reached. However, false indications are received when mechanical failures occur within the lockout mechanism.

The use of the pressure-sensing components used in traditional filter modules is also often a significant design constraint in weight- and size-sensitive applications, e.g., aircraft filtration systems. Moreover, traditional filter modules offer no real-time means for predicting when a filter element will need to be replaced. In addition, traditional filter modules disturb or alter fluid flow by requiring that sensing components be inserted into the stream of flow, creating turbulence. Also, prior sensors are designed to indicate an out-of-range condition when the value of a measured property falls outside of pre-set limits. As such, continuous measurement and real-time monitoring and indication may not be available with such designs.

Moreover, traditionally, separate devices have typically been used to measure different properties (e.g., temperature and pressure), thus increasing the size and cost of the overall system. Similarly, at present, filter or fluid power manifolds that have separate upstream circuits but share a common downstream passage require the use of separate devices to measure, e.g., differential pressure, across each filter element (or any device or component that provides a measurable pressure drop). This also holds true for filter or fluid power manifolds that have separate downstream circuits, but share a common upstream passage. As before, the use of separate individual devices is generally disadvantageous as it leads to increased cost, weight, design envelope size, and reduced reliability.

In recent years, attempts have been made to overcome the above-mentioned shortcomings by using Micro-Electro-Mechanical Systems (MEMS) devices in conjunction with filter modules. MEMS devices comprise semiconductor chips which include microfabricated mechanical systems on the chip. More generally, MEMS are directed to the integration of mechanical elements, sensors, actuators, and electronics on a common substrate through the utilization of microfabrication technology. While the electronics are fabricated using integrated circuit (IC) process sequences, the micromechanical components are fabricated using compatible micromachining processes that selectively etch away parts of a silicon wafer, e.g., or add new structural layers (e.g., by deposition), to form the mechanical and electromechanical devices. In this way, MEMS represents a complete systems-on-a-chip, free of discrete, macro-scale, moving mechanical parts. In short, in MEMS devices, the microelectronic integrated circuits provide the decision-making capability which, when combined with MEMS sensors, actuators, etc., allow microsystems to sense, provide feedback to/from, and control the environment.

Thus, commonly-assigned U.S. application Ser. No. 09/721,499, filed Nov. 22, 2000, now U.S. Pat. No. 6,471,853, is directed to a filter module that incorporates MEMS sensors to measure various characteristics of fluid flow and filtration, including the temperature, flow rate, pressure, etc. of the fluid. One or more MEMS sensors may be incorporated into a sensor package which, in turn, is included in a sensor component. The latter, which typically may include a processor, conductor pins, etc. for data communication, is coupled to a sensor port of a manifold in such a way as to allow contact between the fluid and at least one surface of the sensor(s).

As shown in FIGS. 1A and 1B, a filter module containing a MEMS sensor component of the type described in the above-mentioned patent application may include a filter body (e.g., a filter bowl) 1, a filter element 2, and a filter manifold 3. The filter manifold 3 may have one or more sensor ports 4 in which one or more MEMS sensor components 5 may be mounted. The filter manifold 3 may have one or more inlet fluid flow cavities 6 and one or more outlet fluid flow cavities 7. The sensor ports 4 may extend through the housing 8 of the filter manifold 3. Seals may be used to ensure that the interface between each sensor port 4 and the corresponding sensor component 5 is made fluid-tight.

The filter element 2 may have an end cap 9 attached to one end (the dead end). In general, the shape and location of the inlet fluid flow cavity 6 and the outlet fluid flow cavity 7 may depend upon a number of factors, including the desired flow characteristics of the unfiltered or filtered fluid, the size and shape of the filter element 2 and filter body 1, the fluid being filtered, and the like. Each sensor component 5 includes a sensor package 10 which contains one or more MEMS sensors. As shown in FIG. 1B, the sensor ports 4 and the sensor components 5 are configured such that, when in place, each sensor package 10 is flush with the stream of fluid flow (e.g., flush with the inner surface of inlet cavity 6 and outlet cavity 7).

In order to measure the differential pressure between two locations of fluid flow (e.g., across a filter element 2) using MEMS sensor components of the type described above, at least two such sensor components must be used. More specifically, a first MEMS sensor component 5 having at least one pressure sensor is deployed at an upstream location, e.g., within a port 4 in an inlet cavity 6, and a second MEMS sensor component 5 having at least one pressure sensor is deployed at a downstream location, e.g., within a port 4 in an outlet cavity 7. Respective pressure readings from the first and second sensor components are communicated to a processor or similar device through electrical conductors, and a differential pressure across the membrane of the filter element 2 is calculated based on the difference between the first and second sensor component readings.

MEMS sensor components of the type described above have thus improved upon conventional modules and sensors by eliminating macro-scale mechanical parts, addressing weight and size concerns, allowing real-time monitoring, and providing a sensor package that can be placed flush with the stream of flow, thus avoiding interference with fluid flow. Nevertheless, in light of the high cost of retrofittable sensors (e.g., differential pressure sensors) and the difficulties associated with wiring such sensors to a "communications bus", there is a need for low-cost, lower-weight, reliable, non-mechanical sensing devices that may be retrofittable, capable of integrating one or more differential pressure sensors, and capable of wirelessly communicating sensing- and measurement-related data.

DETAILED DESCRIPTION

Embodiments of the present invention are directed to sensor components in which various MEMS sensors for measuring pressure, differential pressure, flow rate, temperature, pH level, viscosity, and/or moisture content of the fluid flow may be used. Multiple MEMS sensors may be arranged on a single chip to form a sensor package, and multiple sensor packages may be included in a single, unitary sensor component. The MEMS sensors may output real-time measurements or related data, thus allowing real time continuous monitoring of the fluid system. The measurements or data may be interpreted to predict when failure of the filter element will occur or to determine whether replacement of the filter element is necessary. In particular embodiments, MEMS sensor data may be used to detect the occurrence of undesirable events such as particle breakthrough or cavitation.

In addition to allowing real time continuous monitoring (as opposed to merely providing an indication at pre-set values), the present invention improves reliability by reducing the number of macro-scale mechanical components and/or moving parts that are typically used in traditional systems, as well as by allowing redundancy of sensor packages and/or of sensors within a given sensor package. Moreover, by including multiple MEMS sensors on a sensor package, the present invention eliminates the need for separate devices to measure temperature, pressure, differential pressure, etc. This, in turn, reduces costs, as well as system weight and envelope size.

In some embodiments, a single sensor component may contain multiple pressure sensors which are configured in such a way as to allow determination of a differential pressure without the need to include an additional sensor component. Thus, the inclusion of multiple sensor packages in a single sensor component allows installation, or retrofitting, in applications where only one port is available and traditional devices and methods would require two separate sensor ports and assemblies (e.g., measuring differential pressure with a single sensor component placed into a single port, as opposed to placing two separate sensor assemblies into two separate ports).

Embodiments of the present invention are also directed to single-body sensor components (e.g., single-body differential pressure devices) that may be used in systems having multiple separate upstream circuits that share a common downstream passage or, vice versa, where multiple separate downstream circuits share a common upstream passage. In one embodiment, the present invention also provides a MEMS sensor component having a wireless data-communication capability.

Figure 2:
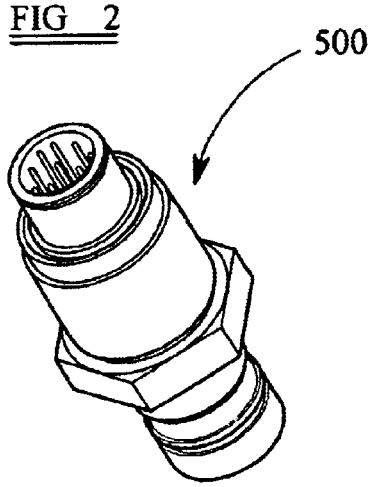
FIG. 2 shows a sensor component according to an embodiment of the present invention.
Figure 3:
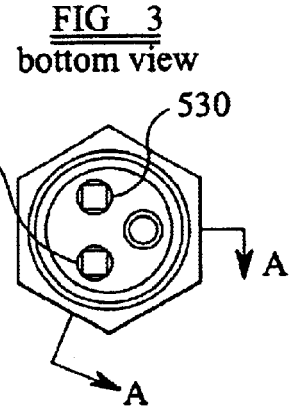
FIG. 3 is a bottom view of the embodiment shown in FIG. 2.
Figure 4:
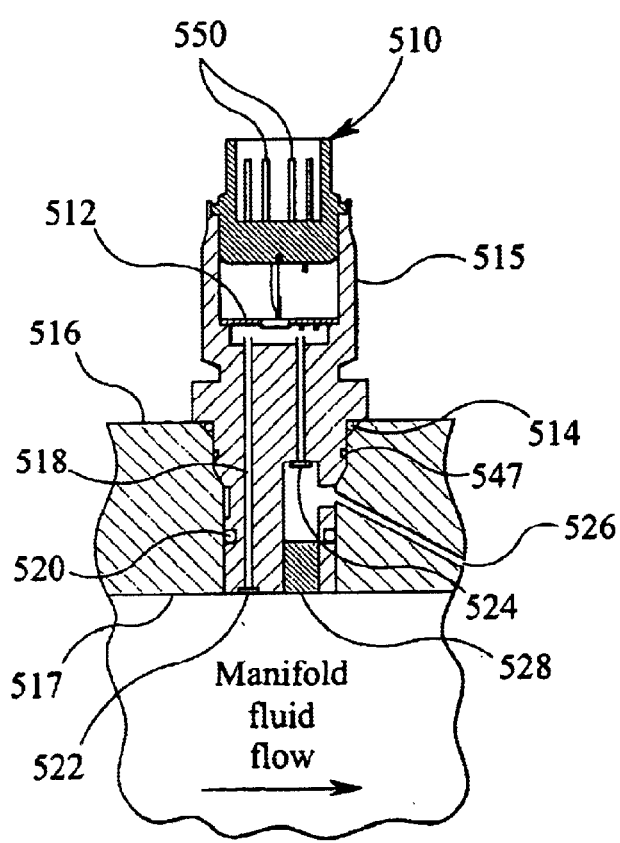
FIG. 4 shows a cross-sectional view through segment A—A of the embodiment shown in FIG. 3.
Figure 5:
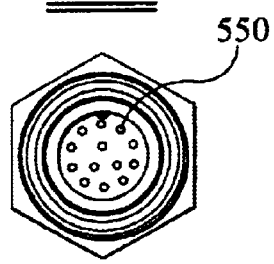
FIG. 5 shows a top view of the embodiment shown in FIG. 2.
Figure 6:
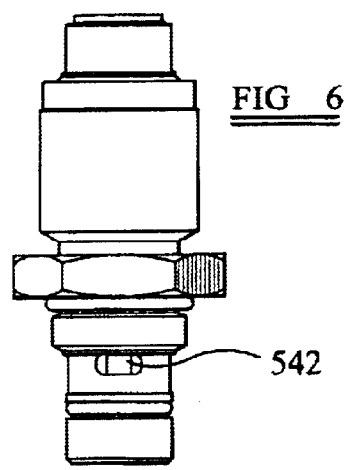
FIG. 6 shows a side view of the embodiment shown in FIG. 2.
Figure 7:
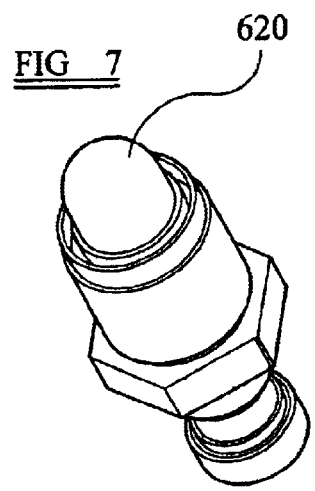
FIG. 7 is an illustration of an alternative embodiment of the present invention.

FIG. 2 shows a sensor component 500 according to an embodiment of the present invention. As shown in FIGS. 3–6, the sensor component 500 may generally have a cylindrical configuration. In a preferred embodiment, the sensor component 500 includes at least a first MEMS sensor package 522 and a second MEMS sensor package 524, wherein each sensor package contains one or more MEMS sensors, including sensors for measuring pressure, temperature, differential pressure, and flow rate. In the embodiment of FIG. 4, a bottom view of which is shown in FIG. 3, a third sensor package 530 may be included, with MEMS sensors for measuring viscosity, pH level/acidity, conductivity, free water content, lubricity, oxidation reduction potential (ORP), etc. of a given fluid.

In a preferred embodiment, at least one of the sensor packages (e.g., the first sensor package 522) is exposed directly to the upstream fluid, i.e., the fluid that is transmitted to the inlet side of the filter element. Thus, as shown in FIG. 4, when placed into a sensor port 547, a front face of the sensor package is flush with the interior surface 517 of the filter manifold 516 (or of the fluid flow cavity, or other structure housing the sensor component) in such a way as to be in contact with the fluid as it flows by.

A second sensor package, however, might not be flush with the stream of fluid flow. Rather, as depicted in FIG. 4, the second sensor package 524, e.g., is isolated from the upstream fluid via a plug 528 that is inserted at one end of the sensor component 500. The second sensor package 524 is arranged such that it can measure properties of the downstream fluid (e.g., the fluid that is transmitted from the outlet side of the filter element) through an aperture 542 (see FIG. 6) within the casing 515 of the sensor component 500, and a channel 526 (see FIG. 4) that provides an opening through the manifold 516. Thus, downstream fluid measurement may be obtained by porting the downstream fluid to the second sensor package 524. In an alternative embodiment, downstream fluid conditions may be monitored without direct contact between the fluid and the sensor package 524 by using, e.g., a pitot-tube-type arrangement in conjunction with channel 526 and aperture 542. In addition, an isolation seal 520 may be used to isolate upstream and downstream pressures.

In embodiments of the present invention, data collected using the multiplicity of sensors and/or sensor packages may be processed and/or transmitted through the use of electrical conductors and data-processing devices. For example, the embodiment shown in FIG. 4 includes electrical conductors 518 for communication of measurement data to a processor 512. The processor 512, in turn, may be connected to conductive pins 550 of an electrical connector signal interface 510 in such a way as to allow transmission of data from the sensor component 500 (to, e.g., a separate data processing device). In other embodiments discussed below, data transmission may be achieved wirelessly.

Advantageously, using the data collection/transmission/processing capabilities described herein, embodiments of the present invention allow for measurement of differential pressure and similar parameters using a single MEMS sensor component by including multiple sensor packages within the same sensor component. This is especially desirable in applications (e.g., retrofitting/updating older systems) where only one sensor-component port, rather than two, is available for measuring differential pressure and other such parameters. In addition, in contrast to existing designs, where an indication is provided only when pre-set parameter values have been reached, embodiments of the present invention allow continuous real-time monitoring of the fluid system.

Moreover, embodiments of the present invention achieve improved reliability by allowing the use of redundant sensor packages, as well as redundant sensors in each sensor package. Also, the sensors may be temperature compensated to ensure accuracy over the entire mission range. In addition, given their relatively small mass, the MEMS sensor packages are inherently tolerant of extreme vibrational environments.

Figure 8:
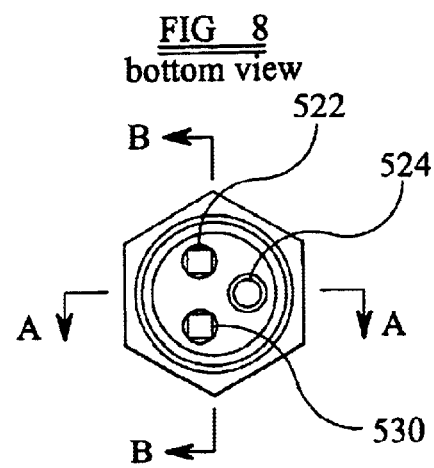
FIG. 8 is a bottom view of the embodiment shown in FIG. 7.
Figure 9:
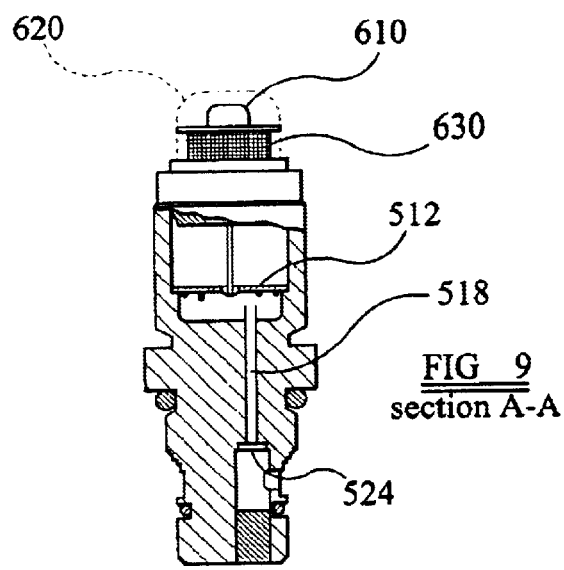
FIG. 9 shows a cross-sectional view through line A—A of the embodiment shown in FIG. 8.

In an alternative embodiment, shown in FIGS. 7–10, the sensor component 500 comprises a warning mechanism 610 at an end opposite the sensor packages 522,524. The warning mechanism 610 may include a visual warning light, an audible alarm, etc. configured to indicate an out-of-range condition of the fluid. Typically, the warning mechanism 610 will be battery operated, utilizing a replaceable battery 630 as depicted in FIG. 9. In addition, the sensor component 500 may include a transparent dust cover 620 to protect the warning mechanism 610, especially when the warning mechanism 610 is a visual warning light.

Figure 10:
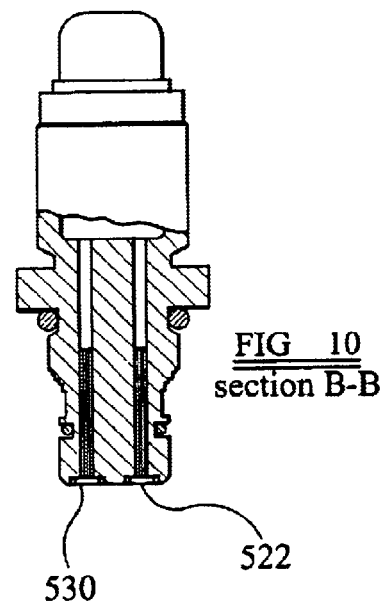
FIG. 10 shows a cross-sectional view through line B—B of the embodiment shown in FIG. 8.

The embodiment shown in FIGS. 7–10 includes the first and second sensor packages, 522, 524, as well as a third sensor, package 530. More specifically, FIG. 10 shows a cross-sectional view of the sensor component through line A—A of FIG. 8, and FIG. 10 shows a cross-sectional view of the sensor component through line B—B of FIG. 8. In FIG. 9, the second sensor package 524 is shown with a connection to the processor 512 via electrical conductors 518. FIG. 10, on the other hand, depicts the first sensor package 522, and the third sensor package 530.

Figure 11:
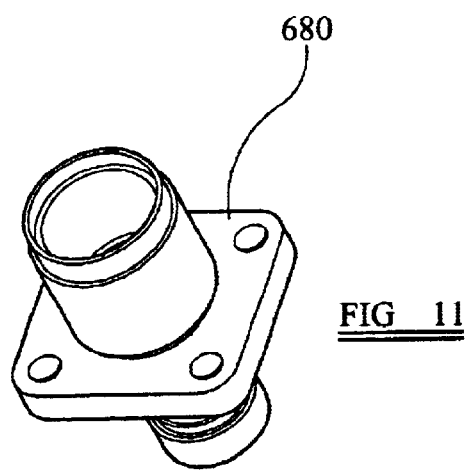
FIG. 11 shows an attachment configuration for use with an embodiment of the present invention.

As shown in FIG. 4, the sensor component 500 may be held in place within the sensor port 517 by a housing seal 514. Alternatively, the various embodiments of the sensor component 500 may be threaded, or may include a flange 680 that is perpendicular to the longitudinal axis of the sensor component 500 and which protrudes' from the periphery of the sensor component (see FIG. 11). The flange 680 is configured to be secured to the filter manifold 516 with bolts or other similar means, thus holding the sensor component in place.

Figure 12:
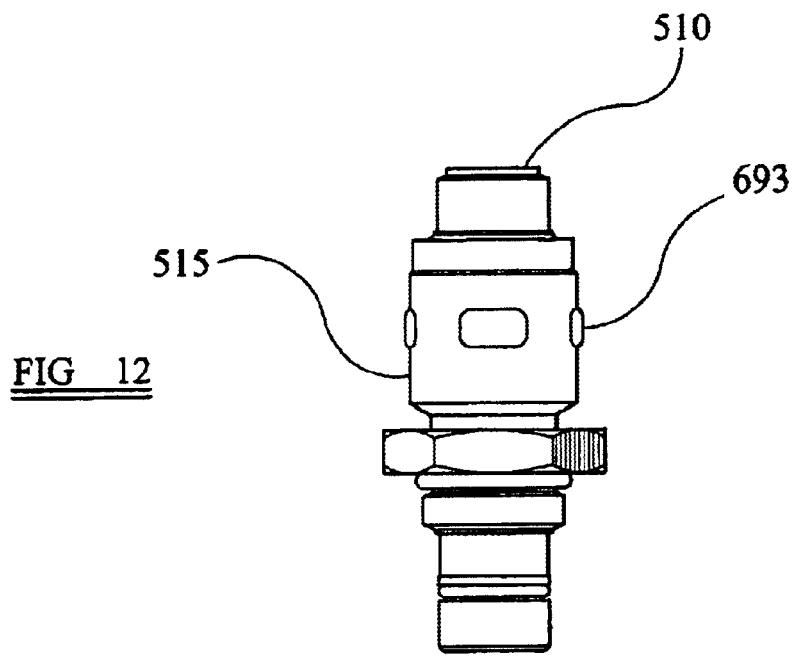
FIG. 12 shows an alternative embodiment of the present invention.

FIG. 12 shows yet another alternative embodiment of the sensor component 500. Here, a warning mechanism is contained within the casing 515 of the sensor component 500. The casing 515, in turn, includes circumferential holes 693 through the periphery thereof, such that a visual warning light can be seen through the holes 693. As such, in this embodiment, a visual out-of-range indication is provided through the holes 693 rather than through a transparent cover (e.g., transparent dust cover 620) placed at one end of the sensor component 500.

Figure 13:
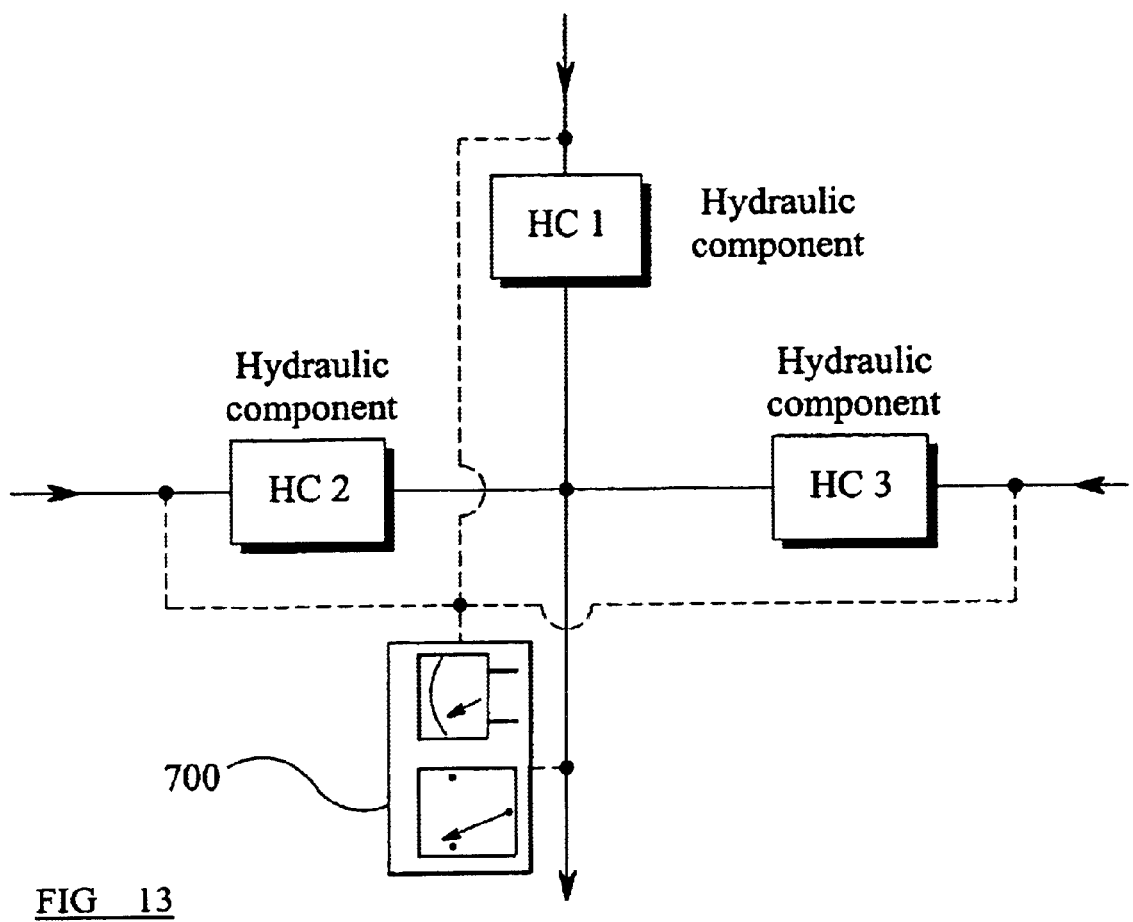
FIG. 13 depicts a schematic of a hydraulic system using a sensor component according to an embodiment of the present invention.

FIGS. 13–16 show an alternative embodiment of the present invention for applications requiring data collection from more than two points within a given system. More specifically, FIG. 13 is a schematic diagram of a hydraulic system wherein three hydraulic components (e.g., a filter or other component across which a measurable pressure drop exists), each with a separate upstream circuit, are arranged so as to have a common downstream passage. Traditionally, differential pressure measurements across each of the components HC1, HC2, HC3 would require two separate pressure sensors, one of which would be placed upstream, and the other, downstream, of the component. As such, for the system shown in FIG. 13, at least four separate pressure sensors (i.e., one at each upstream circuit, and one at the common downstream passage) would have to be used.

Taking advantage of the principles discussed herein, however, embodiments of the present invention allow for the use of fewer sensing devices. For example, only three sensor components of the type discussed in connection with FIGS. 2–12 need be used to calculate differential pressures across all of the components HC1, HC2, and HC3. This is especially true when the components HC1, HC2, and HC3 share neither a common upstream passage nor a common downstream passage.

When either a common upstream passage or a common downstream passage exists, however, an alternative embodiment of the present invention enables calculation of all of the differential pressures using a single MEMS sensor component (i.e., a single-body differential pressure sensing device). Thus, with reference to the schematic of FIG. 13, a single sensor component having four sensor packages is used, wherein three pressure sensor packages are used to monitor the three separate upstream pressures of the system, and one pressure sensor package is used to monitor the common downstream pressure, thus allowing for a smaller, lighter, and more reliable hydraulic system.

Figure 14:
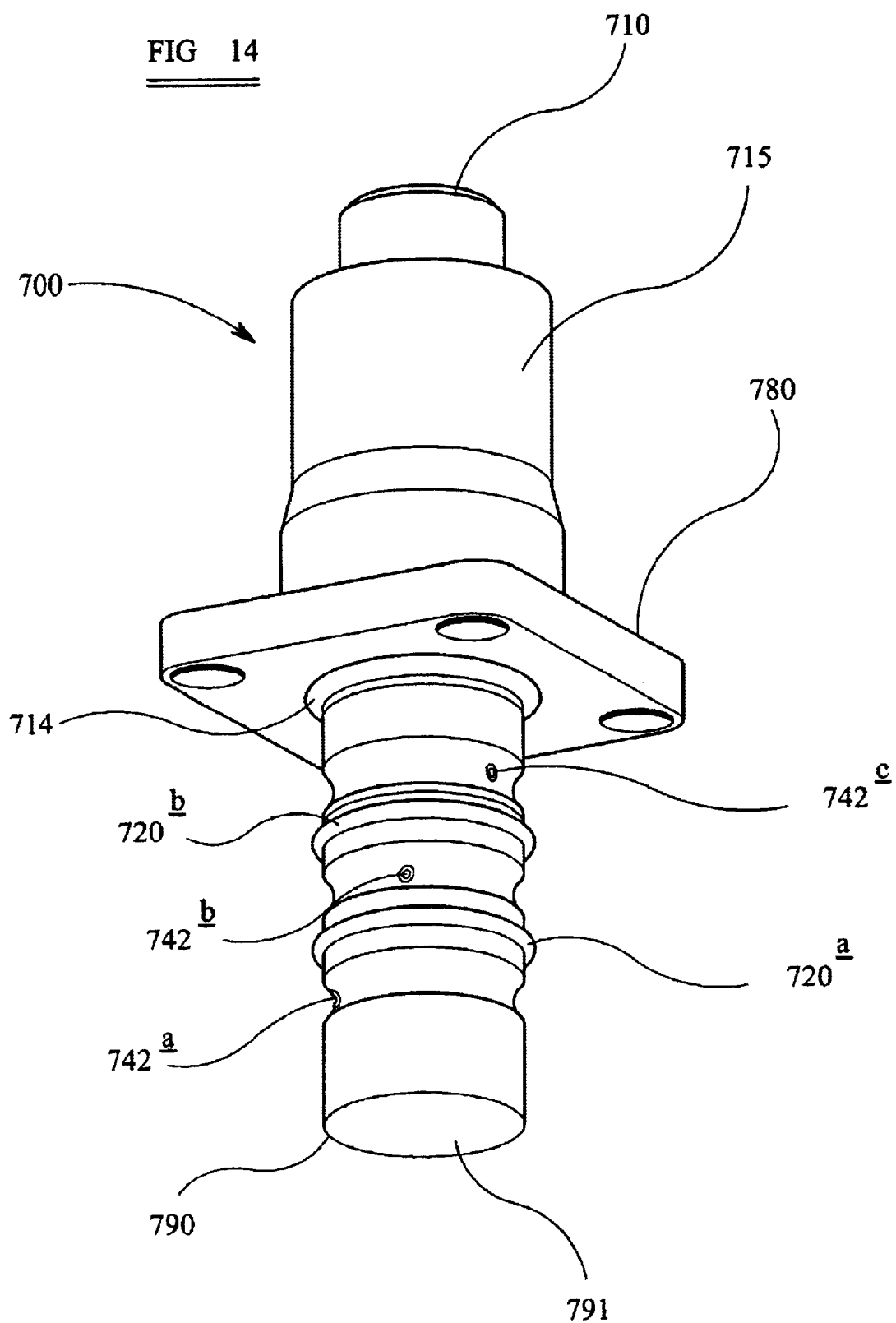
FIG. 14 shows an alternative embodiment of the present invention.
Figure 15:
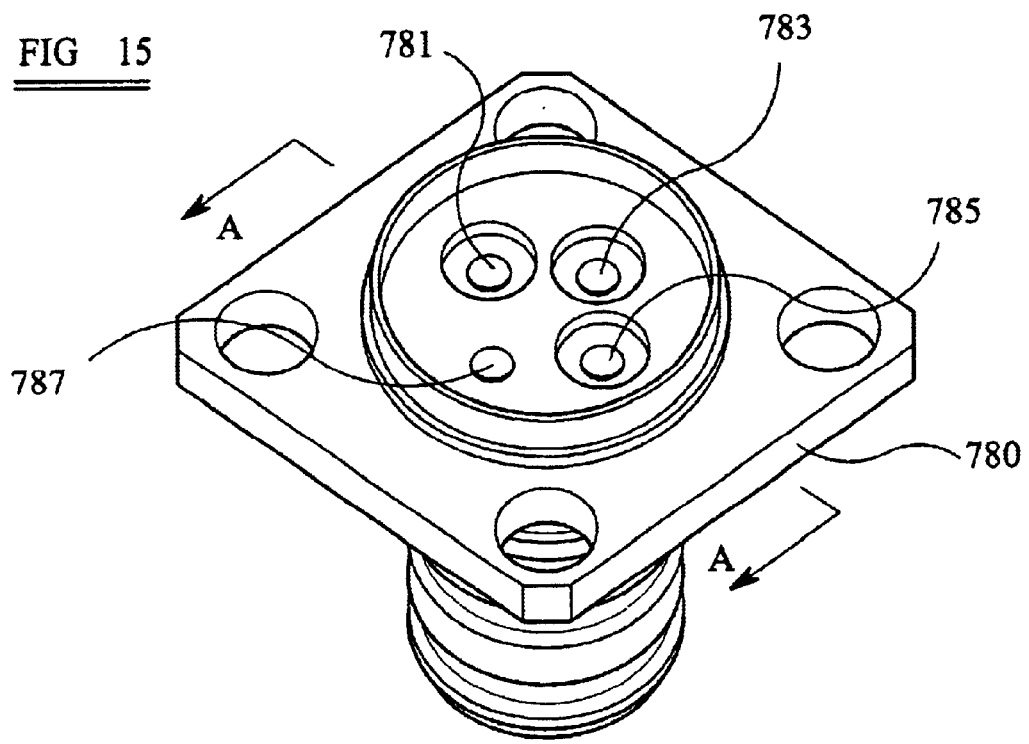
FIG. 15 shows a top view of the embodiment depicted in FIG. 14.
Figure 16:
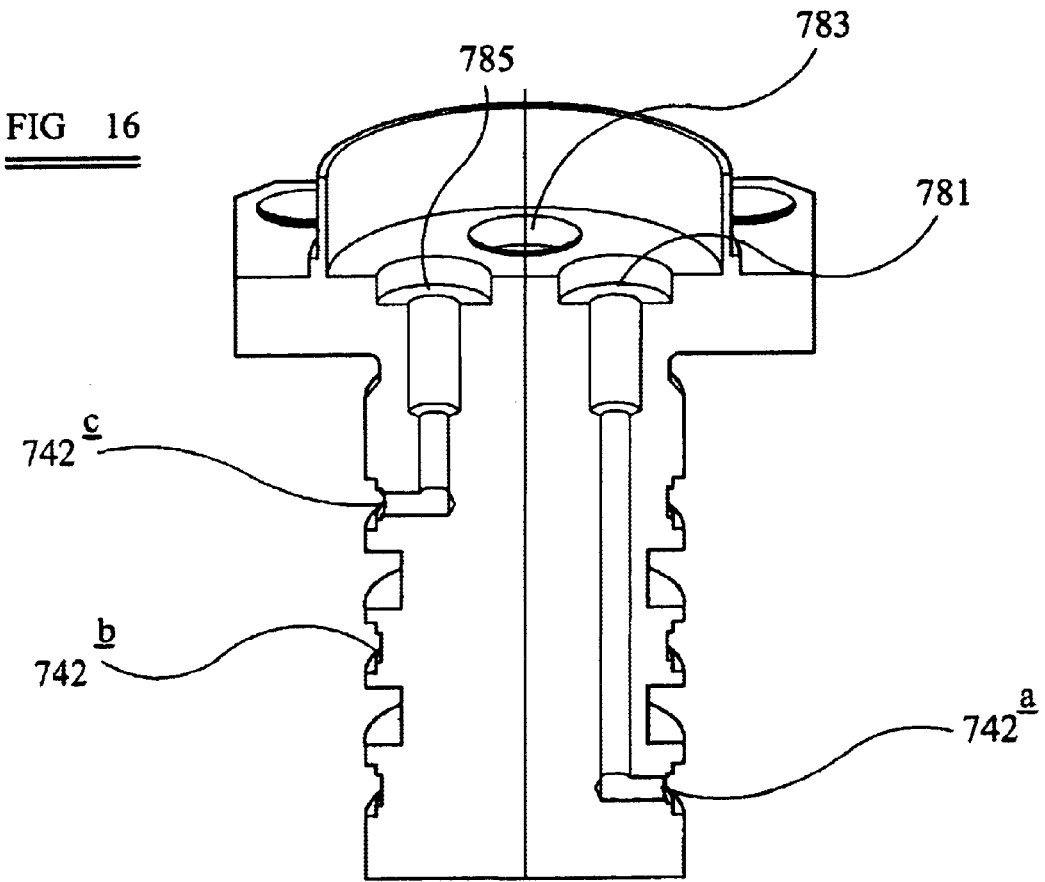
FIG. 16 shows a cross-sectional view through segment A—A of the embodiment shown in FIG. 15.
Figure 17:
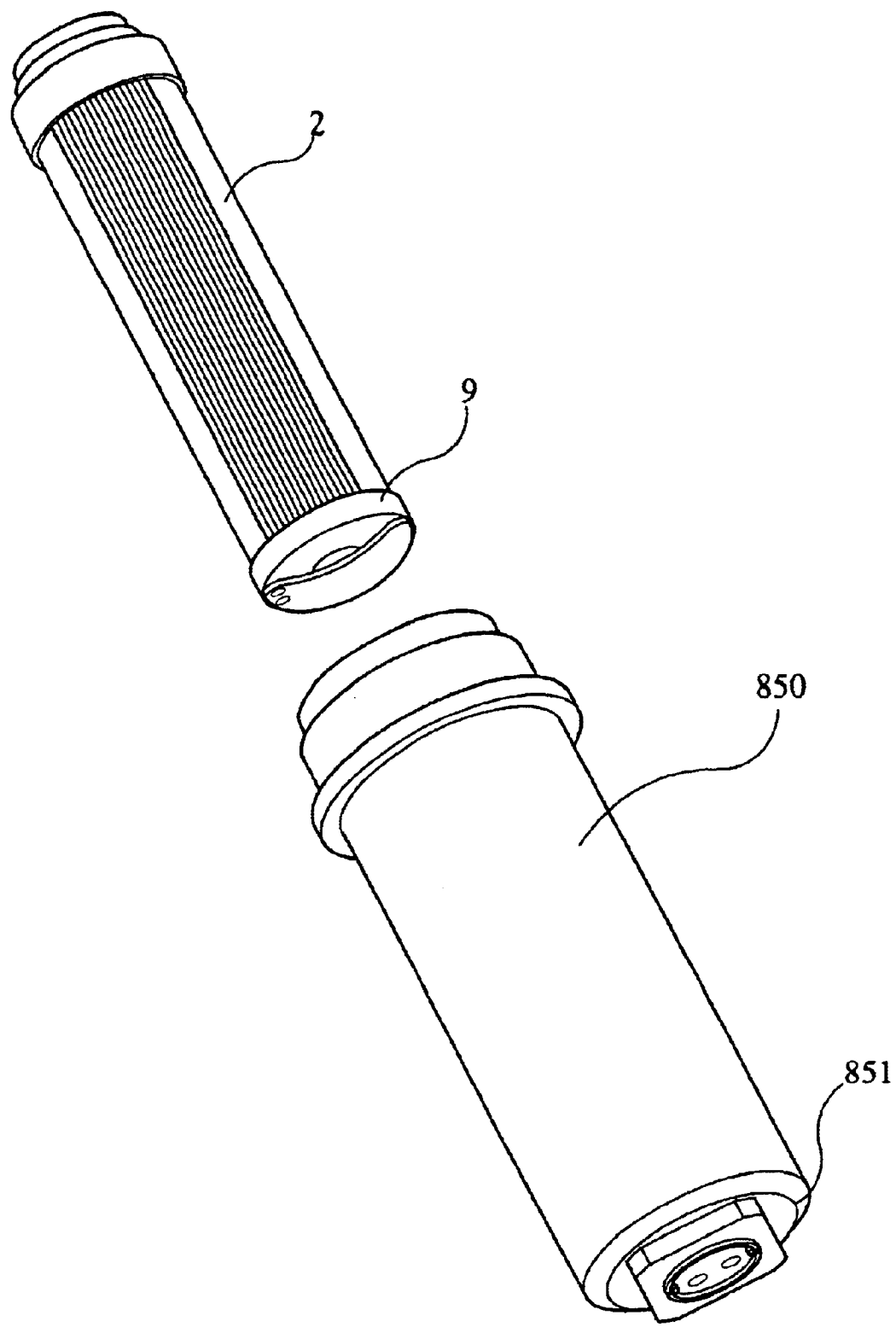
FIG. 17 is an illustration of an alternative embodiment of the present invention.

FIGS. 14–16 show a sensor component 700 that is adapted to detect differential pressures across two separate hydraulic components that share either an upstream or a downstream passage. This arrangement would utilize three sensor packages, each having at least one MEMS pressure sensor. Accordingly, sensor component 700 includes three sensor-package receptacles 781, 783, 785, two of which may receive sensor packages for monitoring pressures in the two separate (e.g., upstream) circuits, and the third may receive a sensor package for monitoring pressure at the common (e.g., downstream) passage.

It is noted that each of the sensor packages mentioned above may include additional sensors, e.g., one or more MEMS temperature sensors in addition to the at least one MEMS pressure sensor. Also, as shown by way of example in FIG. 14, the sensor component 700 may optionally include, at a bottom face 791 thereof, a separate sensor package 790 for flow measurement. When this is the case, the sensor component 700 also includes an electrical lead passage 787 which provides a conduit leading away from the fluid flow sensor package 790.

As shown in FIGS. 14 and 16, the receptacles 781, 783, 785 are in flow communication with separate pressure-port apertures 742a, 742b, 742c, respectively. Thus, as discussed previously in connection with the embodiment shown in FIGS. 4 and 6, each of the sensor packages contained in the receptacles 781, 783, 785 may be configured to measure properties of the fluid at a different location by porting the fluid to a sensor package through a respective pressure-port aperture 742a, 742b, 742c. This may be done, for example, by using channels that are similar to channel 526 shown in FIG. 4. In this regard, an isolation seal 720a, such as an O-ring, may be used to isolate system pressure between pressure-port apertures 742a and 742b. Similarly, an isolation seal 720b may be used to isolate system pressure between pressure-port apertures 742b and 742c. In addition, the sensor component 700 may include a third isolation seal 714 to isolate the sensor component from the atmosphere (see, e.g., housing seal 514 in FIG. 4).

Data collected using the multiplicity of sensors and/or sensor packages may be processed and/or transmitted through the use of electrical conductors and data-processing devices. To this end, sensor component 700 includes an electrical housing 715 which may include electrical conductors, one or more processors, and/or conductive pins (within an electrical connector 710) which may be configured to allow transmission of data to/from a data processing device.

In addition, the sensor component 700 may include a visual warning light, an audible alarm, or other warning mechanism that is configured to indicate an out-of-range condition of the fluid for each of the hydraulic components being monitored. Moreover, similar to flange 680 shown in FIG. 11, sensor component 700 may include a mounting flange 780 that is configured to be secured to a filter manifold (not shown), thus holding the sensor component in place.

Figure 1:
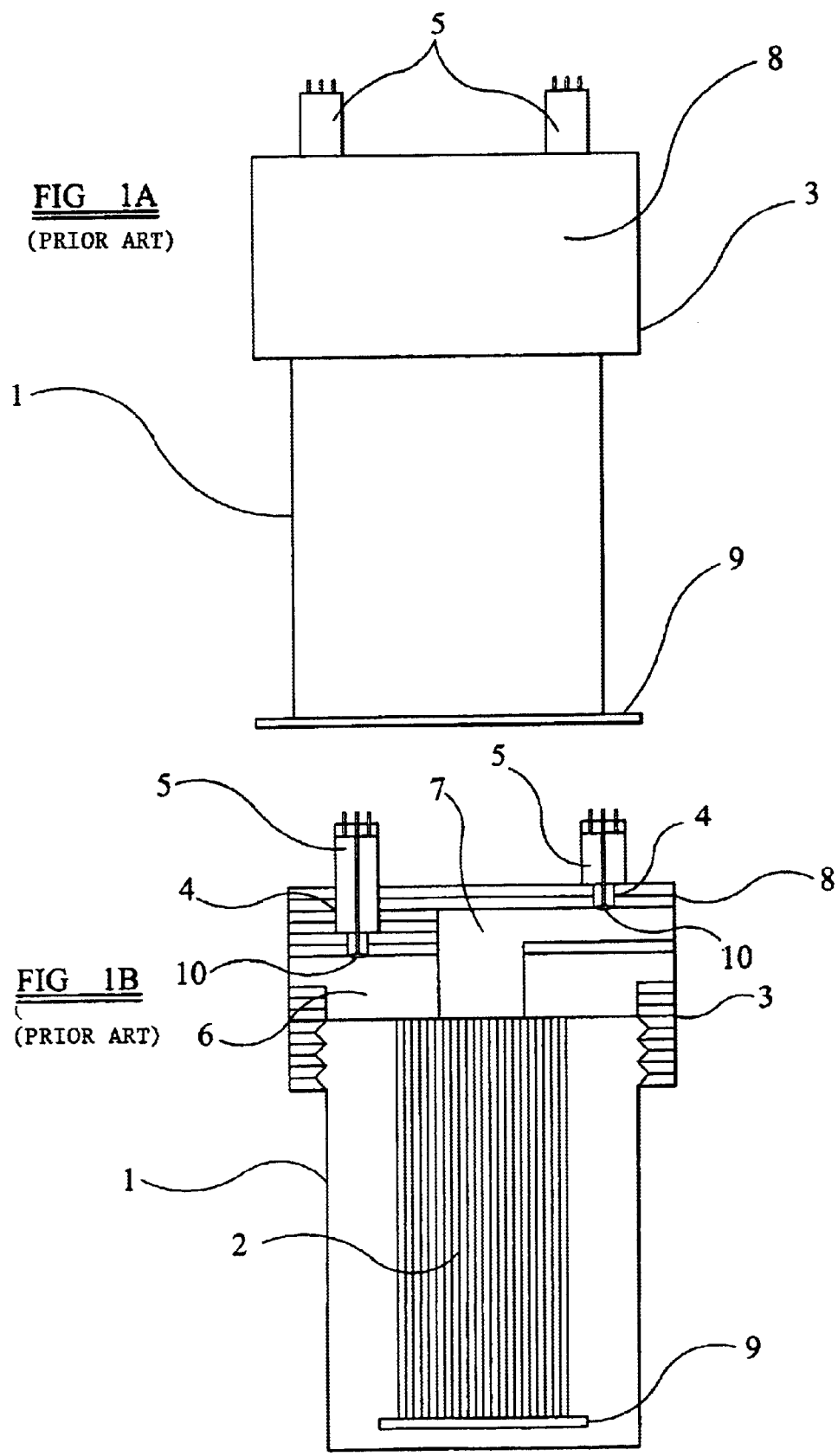
FIGS. 1A and 1B depict a typical filter module having a manifold which is configured to receive one or more sensor components within sensor ports thereof.

FIGS. 17–20 show an alternative embodiment, wherein measurement data may be wirelessly transmitted to a remote signal receiver 852 (i.e., a signal receiver that is not electrically connected to the sensor component). A filter element 2, having an end cap 9 (see FIGS. 1A and 1B), is normally housed in a bowl, or casing, 850. In this embodiment, a sensor component 860 may be placed in a port 868, which may be an axial opening through the end cap 9. The sensor component 860 may generally be of the types discussed in connection with FIGS. 2–16, where a plurality of sensor packages, each having one or more MEMS sensors, are included within a single sensor component. Thus, although FIGS. 17–20 depict a wireless differential pressure device, wherein a single sensor component 860 is configured to measure a differential pressure using a plurality of sensor packages and MEMS pressure sensors that are in communication with the unfiltered and filtered fluids, it will nevertheless be understood that such depiction is by way of example only. That is, the features of the invention discussed herein may be applied to sensor components that enable measurement of properties other than (or in addition to) the fluid's upstream and downstream pressures, as well as to configurations in which redundant sensors and/or sensor packages may be used.

Figure 19:
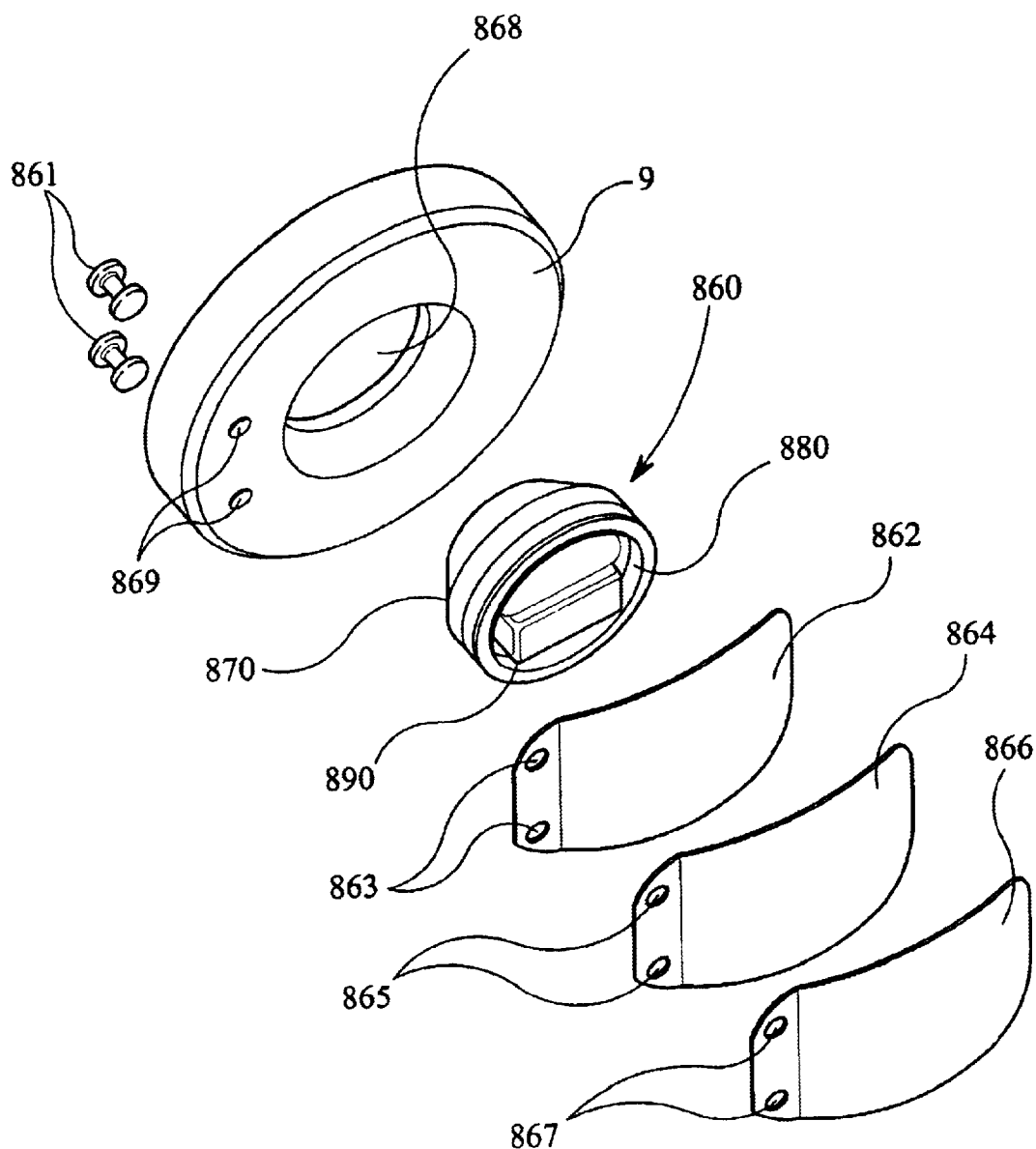
FIG. 19 is an exploded view of an end cap of the embodiment shown in FIG. 17.

As shown in FIG. 19, the sensor component 860 includes a sensor-component housing 880 which, in a preferred embodiment, is adapted to be snapped into the port 868. In this way, an embodiment of the invention provides a re-usable sensor component for use with a filter element 2 which, itself, may be a throw-away component. The sensor component 860 may include a sealing member 870, such as, for example, an O-ring, so as to provide a fluid-tight interface between the sensor port 868 and the housing 880, thus preventing any flow bypass through the port 868.

The sensor component 860 may be retained in the port 868 using one or more retaining braces 862, 864, 866, which may be overlapped. In one embodiment, each of the retaining braces 862, 864, 866 includes transverse apertures 863, 865, 867, respectively, which come into alignment with end cap apertures 869. The end cap 9 and the brace(s) are then held together by passing connection means 861, such as pins, or snap members, through the end cap apertures 869 and the transverse apertures 863 (865, 867).

As has been discussed in connection with embodiments described previously, the sensor component 860 may also include hardware, including one or more, processors, electronics, etc. for processing measurement data prior to transmission. In addition, the sensor component 860 may include a power supply 890. In a preferred embodiment, the power supply 890 includes a battery, which may be rechargeable, and which provides the sensor component 860 with stand-alone, wireless, functioning capabilities.

Figure 18:
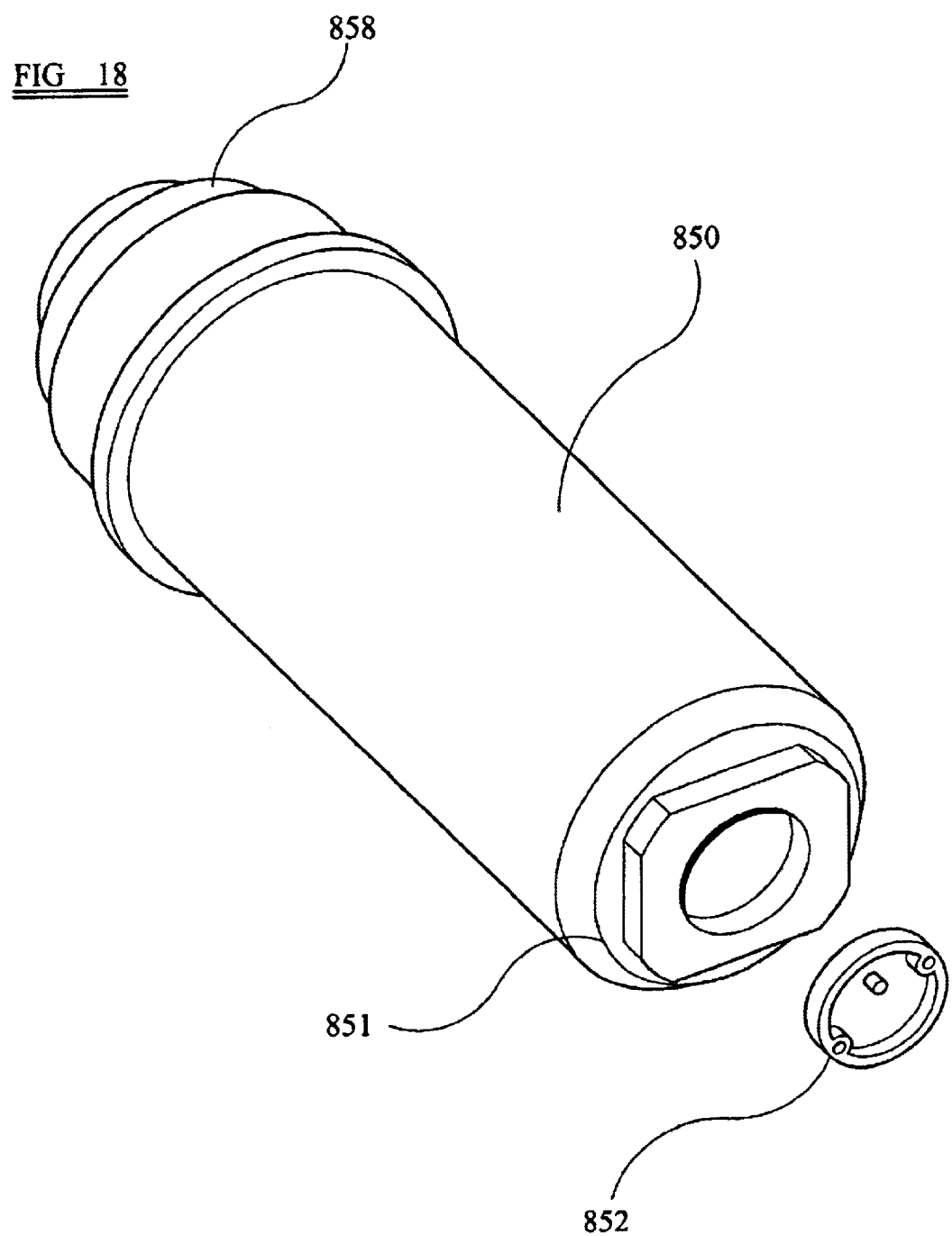
FIG. 18 shows an embodiment of a filter element bowl and signal receiver of the embodiment shown in FIG. 17.
Figure 20:
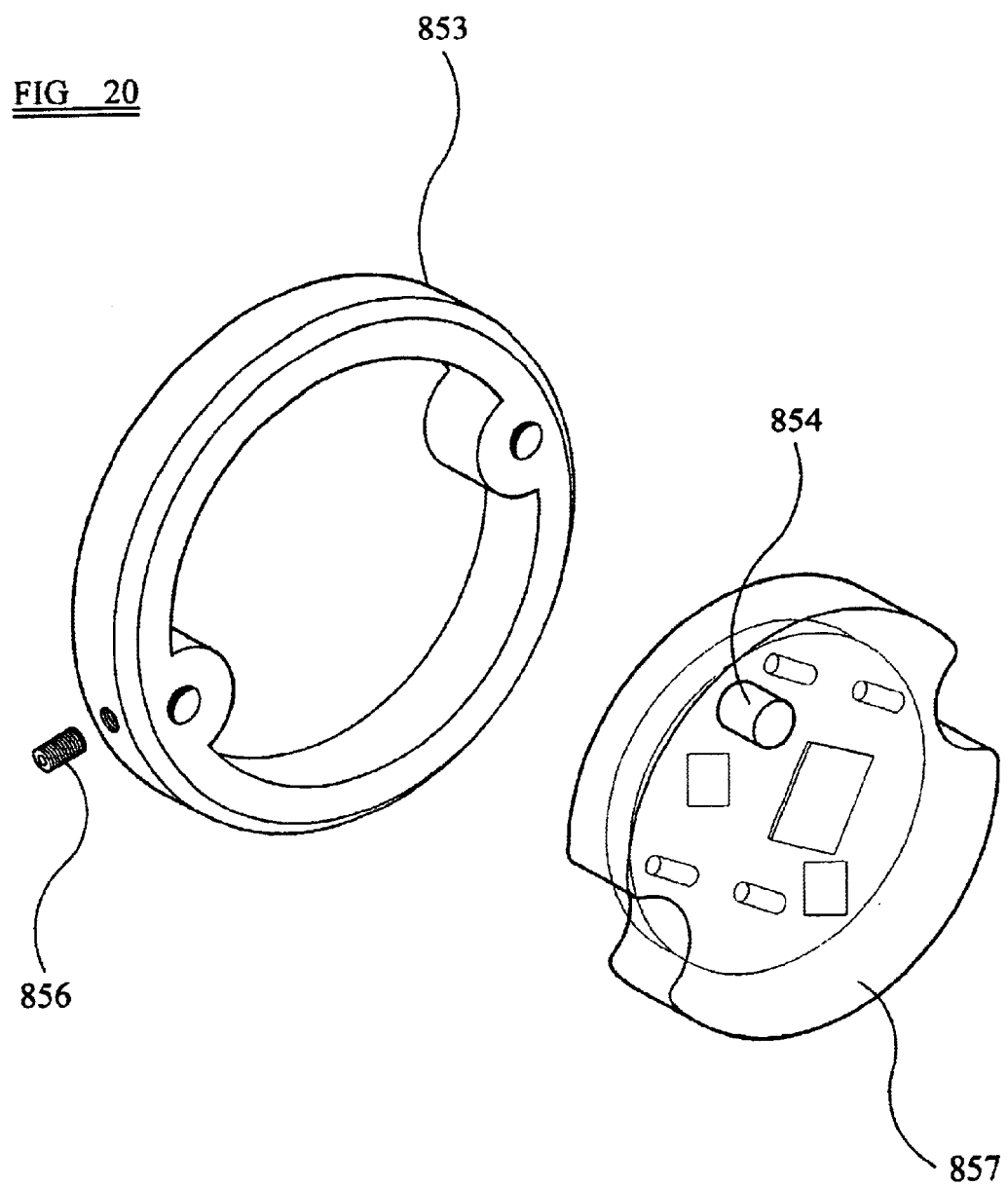
FIG. 20 is an illustration of a signal receiver assembly of the embodiment shown in FIG. 18.

FIGS. 18 and 20 show an embodiment of the casing 850 and remote signal receiver 852 of the present invention. The casing, or bowl, has a top end 858 and a bottom end 851, wherein the latter may be proximate the end of the filter element 2 which has the end cap 9 mounted thereon (see, e.g., FIG. 17). The signal receiver 852 includes a receiver housing 853, as well as a power supply and hardware (e.g., processor, electronics, etc.) 857 that are encased within the housing 853 and may be locked in place using an insert 856. The insert 856 may be, e.g., a nylon thread-lock insert. As with the sensor component 860, the power supply of the signal receiver 852 may include a rechargeable battery, thereby providing a stand-alone, self-powered signal receiving unit. The signal receiver 852 may be coupled to the bottom end 851 of the casing 850, e.g., by providing mutually-mating threaded surfaces. In a preferred embodiment, the signal receiver 852 also includes a warning mechanism 854, such as a visual (LED) indicator.

In practice, the filter element 2 having a sensor component 860 in an end cap 9 thereof is housed by the casing 850 having a signal receiver 852 in a bottom end 851 thereof. The sensor component includes sensor packages that are in communication with the unfiltered and filtered fluids. Thus, as fluid flows through the filter, the sensor component 860 determines a differential pressure across the filter element 2. In one embodiment, the measurement data is then transmitted, wirelessly, to the signal receiver 852, when a predetermined differential pressure is reached. In another embodiment, data is wirelessly transmitted in predetermined intervals, or continuously in real time.

Depending on the type and properties of the fluid being filtered, the data transmission between the sensor component 860 and the signal receiver 852 may be achieved through RF signals, ultra-sonically, or through other means of wireless communication. Once received by the signal receiver 852, the data may be either processed locally or transmitted to a central computer or data processing device, as discussed with respect to the embodiments of FIGS. 2–16. In addition, the sensor component 860 may comprise a warning mechanism 854, such as a visual warning light, an audible alarm, or similar mechanism that is configured to indicate an out-of-range condition of the fluid (e.g., when a pre-set level is reached). Thus, in various applications, a condition triggering the warning mechanism 854 may be based on measurement data transmitted to the signal receiver 852 relating to pressure, temperature, flow rate, differential pressure, and/or other fluid or filtration characteristics.

In one embodiment, the invention may include a sleep-mode feature, wherein the MEMS sensors of the sensor component 860, as well as the signal receiver 852, are configured to remain in an unactuated state in the absence of fluid flow. Once fluid flow has been initiated, the sensors become actuated, so that measurement data can now be taken. In addition, the signal receiver 852 will become actuated upon receipt of measurement data. When in the sleep-mode, the sensor component's power supply is configured to utilize minute amounts of current, e.g., on the order of micro-amperes. As such, once activated, the power supply will sustain the sensor component as a self-powered unit for upwards of 6000 hours. Similarly, once activated, the signal receiver 852 will remain self-sustaining for upwards of 3000 hours. As noted before, the sensor component 860 and the signal receiver 852 may be removed or replaced when the filter element 2 is replaced with a new filter element.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are, therefore, to be considered in all respects as illustrative and not restrictive, the scope of the invention being indicated by the appended claims rather than the foregoing description. All changes that come within the meaning, and range of equivalency, of the claims are intended to be embraced therein.

What is claimed is:

1. A single-body sensor component for sensing fluid conditions at a plurality of locations in a hydraulic system, wherein said system includes a multiplicity of hydraulic components arranged such that, on a first side, each of the hydraulic components is in fluid communication with a separate fluid circuit, and, on a second side, said multiplicity of hydraulic components share a common fluid passage, said sensor component comprising:

a plurality of sensor packages, each said sensor package including a micro-electromechanical system (MEMS) sensor and being configured to measure a pressure of said fluid at at least one of said locations;

a plurality of sensor-package receptacles, wherein each said receptacle is configured to selectively receive a respective one of said sensor packages;

a casing containing said sensor-package receptacles and sensor packages, said casing defining a plurality of apertures in the periphery thereof; and a plurality of channels fluidly connecting each of the sensor packages with a separate one of said apertures so as to provide fluid communication through each said aperture between each said respective sensor package and the fluid, wherein one of said sensor packages is ported through a respective one of said channels to said shared common fluid passage and, for each hydraulic component, one of said sensor packages is ported through a respective one of said channels to a respective separate fluid circuit on said first side, thereby allowing pressure measurements on said common second side and on said first side of each one of said hydraulic components.

2. The sensor component of claim 1, wherein said sensor component includes at least one more sensor package than the total number of said hydraulic components in said hydraulic system.

3. The sensor component of claim 2, wherein said sensor component includes as many sensor-package receptacles, apertures, and channels as sensor packages.

4. The sensor component of claim 1, wherein, on said first side, each of the hydraulic components is in fluid communication with a separate upstream fluid circuit and, on said second side, said multiplicity of hydraulic components share a common downstream fluid passage.

5. The sensor component of claim 1, wherein, on said first side, each of the hydraulic components is in fluid communication with a separate downstream fluid circuit and, on said second side, said multiplicity of hydraulic components share a common upstream fluid passage.

6. The sensor component of claim 1, wherein each of said sensor packages includes a MEMS pressure sensor.

7. The sensor component of claim 6, wherein each said MEMS pressure sensor is temperature compensated.

8. The sensor component of claim 1, wherein at least one of the sensor packages includes redundant sensors.

9. The sensor component of claim 1, wherein said sensor component includes a redundant sensor package.

10. The sensor component of claim 1, wherein each of said sensor packages includes a temperature sensor.

11. The sensor component of claim 1, wherein said sensor component is configured to measure differential pressure.

12. The sensor component of claim 1, wherein said sensor component further includes at least one of a visual warning light and an audible alarm configured to indicate an out-of-range condition of said fluid for each one of said hydraulic components.

13. The sensor component of claim 12, wherein said condition is determined based on measurement of one or more of said fluid's pressure, temperature, flow rate, and differential pressure.

14. The sensor component of claim 1, wherein said sensor component includes a mounting flange that is disposed around the periphery of said casing so as to lie in a plane perpendicular to the longitudinal axis of the sensor component.

15. The sensor component of claim 1, further including a plurality of isolation seals, wherein each one of said seals is configured to isolate system pressure between a set of two consecutively-arranged apertures.

16. The sensor component of claim 15, further including an additional isolation seal to isolate said sensor component from the atmosphere.

17. The sensor component of claim 16, wherein said isolation seals are O-rings.

18. The sensor component of claim 1, further including an additional sensor package coupled to a bottom face thereof, said additional sensor package being configured to measure a flow rate of said fluid.

19. The sensor component of claim 18, wherein said additional sensor package includes a MEMS sensor and said sensor component further includes an electrical housing and an electrical lead passage in communication with said additional sensor package and said electrical housing.

20. The sensor component of claim 1, wherein each of said sensor packages is configured to communicate its respective measurements to a data processing device.

21. The sensor component of claim 20, wherein said data processing device is configured to calculate a differential pressure for each of said hydraulic components based on pressure measurements taken for said common second side and said first side of each one of said hydraulic components.

22. The sensor component of claim 1, said sensor component further including a processor.

23. The sensor component of claim 22, wherein each said sensor package is configured to take a measurement upon receiving a signal from said processor.

24. The sensor component of claim 1, further including conductive pins within an electrical connector, said pins being configured to transmit data between said sensor component and a data processing device.

25. The sensor component of claim 24, wherein said electrical connector is housed in an electrical housing.

26. The sensor component of claim 24, wherein said data transmission is conducted in real time.

* * * * *